H. ROWNTREE.
ELECTRIC DUMB WAITER CONTROL SYSTEM.
APPLICATION FILED FEB. 9, 1915.
1,284,782.
Patented Nov. 12, 1918.
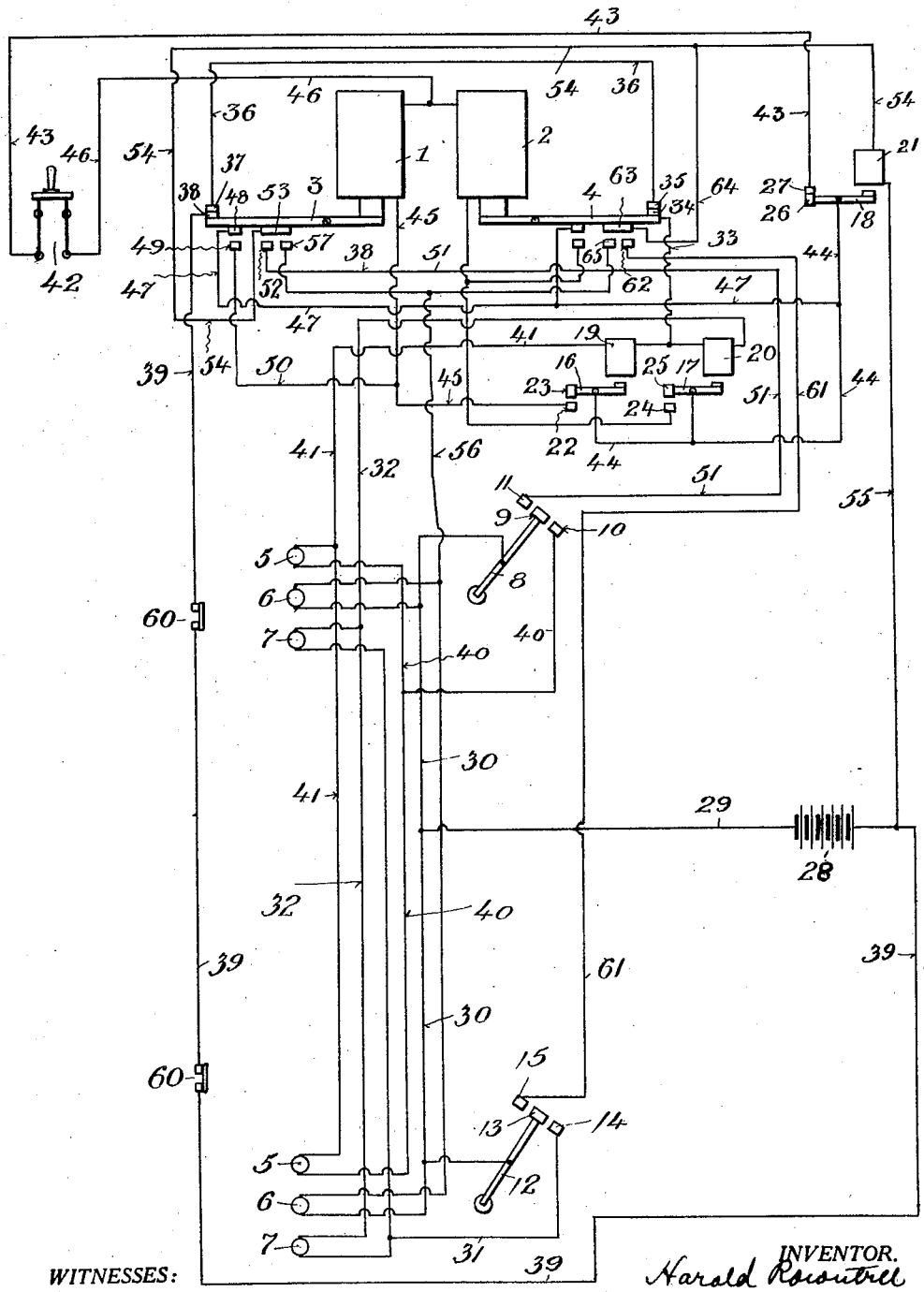
WITNESSES:
INVENTOR.
Harold Rowntree
BY
Samuel E. Darby
ATTORNEYS.

UNITED STATES PATENT OFFICE.

HAROLD ROWNTREE, OF KENILWORTH, ILLINOIS, ASSIGNOR, BY MESNE ASSIGNMENTS, TO ELEVATOR SUPPLIES COMPANY, INC., A CORPORATION OF NEW JERSEY.

ELECTRIC DUMB-WAITER CONTROL SYSTEM.

1,284,782.   Specification of Letters Patent.   Patented Nov. 12, 1918.

Application filed February 9, 1915. Serial No. 7,214.

*To all whom it may concern:*

Be it known that I, HAROLD ROWNTREE, a citizen of the United States, residing at Kenilworth, county of Cook, State of Illinois, have made a certain new and useful Invention in Electric Dumb-Waiter Control Systems, of which the following is a specification.

This invention relates to electric dumbwaiter control systems adapted for use in connection with any type of electrically operated dumbwaiter hoisting mechanism.

The object of the invention is to provide a system of control for electrically operated dumbwaiters wherein the use of high voltage current in the wiring of the elevator shaft is avoided.

A further object is to provide a system of the nature referred to wherein low voltage or battery current is employed in the elevator shaft wiring and in the control circuits, but wherein the battery circuit is closed only momentarily in effecting a control operation.

The invention consists substantially in the construction, combination, location, relation and circuit arrangement, all as will be more fully hereinafter set forth, as shown in the accompanying drawing, and finally pointed out in the appended claims.

The single view of the drawing shows in diagram a circuit arrangement for a control system embodying the principles of my invention.

It has heretofore been a common practice in the electrically operated dumbwaiter art, especially in the use of machines of the type in which control of the movements and operation of the car or dumbwaiter is effected by means of push buttons, to supply operating current for the control system, including the hatchway wiring and push button circuits, having the same voltage as the operating current for the hoisting motor. This practice is objectionable for the reason that it necessitates expensive construction of switches and push button boxes to handle the high voltage current and also it involves the expense of carefully installing and efficiently insulating the hatchway wiring. It has been attempted to avoid these objections by employing low voltage or battery current in the control system circuits, or a portion of such circuits or wiring in the hatchway, but in such cases however, only a part of the hatchway wiring or control circuit system is supplied with low voltage current, or else the circuit arrangement and the control thereof has been such that the low voltage or battery circuit has remained closed for considerable periods of time thereby rapidly exhausting the battery resulting in failure of the battery to supply sufficient current for the control operations, or else requiring frequent renewals of the battery.

It is among the special purposes of my invention to provide a circuit system and arrangement of control for cars and dumbwaiters wherein low voltage or battery current is employed throughout the circuits and wiring connections of the control system, and wherein in the controlling operations, the battery circuit is closed only momentarily in response to any control manipulation.

In carrying out my invention I employ electro-magnets which are supplied with energizing current from a low voltage source, such as a battery, and which magnets control the circuits of the solenoids or other devices employed for starting the hoisting motors in the required direction or for stopping such motors. I also provide limit switches, and, if desired, hatchway door switches, and push button control switches, which also are so interrelated and associated with the electro-magnet or low voltage circuits as to properly control the same in the performance of their respective functions and to be required to control only low voltage current, and I also provide suitable devices and switches to open the battery or low voltage circuit immediately after the same has been closed for any particular cycle of operation, such devices or switches including, in some cases, means to establish auxiliary or by-circuits when the battery circuit is closed, and which auxiliary or by-circuits, when established, effect an opening of the battery circuit.

In the drawing I have shown a control circuit system embodying my invention as applied to a dumbwaiter construction wherein the hoisting motor circuits are controlled by solenoids 1, 2, which respectively control the up and down movements of the car or dumbwaiter. To avoid confusion of the drawing I have omitted showing the hoisting motor or its circuits. The solenoids 1, 2, respectively control the operation of the switch arms 3, 4, which, as above indicated, control the motor circuits (not shown).

The push buttons which respectively control the "up", "stop" and "down" action of the hoisting motor are designated by reference numerals 5, 6, and 7, respectively. These may be of ordinary construction, and, if desired, a set of such buttons may be located at each floor at which the car or dumbwaiter is to stop, or the control buttons may be located at any station from which the dumbwaiter is to be controlled. The upper and lower limit stop switches are designated by reference numerals 8, 12, respectively. These stop switches are designed to be actuated automatically when the car reaches the upper and lower limits of its travel, and when actuated they effect such an operation of the hoisting motor switches as to arrest the motor, as will be more fully pointed out hereinafter. The upper limit stop switch 8 carries a contact 9 which coöperates with a contact 10 when the car is not at the top limit of its travel, and which breaks contact with the point 10, and makes contact with the point 11, when the car arrives at the upper limit of its travel. Similarly the lower limit stop switch 12, carries a contact 13 which coöperates with the point 14, when the car is not at its lower limit of travel, and with contact point 15 when the car reaches its lower limit of travel. Reference numerals 16, 17, 18, designate switches which are respectively controlled by electro-magnets 19, 20, 31. Switch 16, makes contact between contact points 22 and 23, when magnet 19 is energized and breaks contact therebetween when said magnet is deënergized. The switch 17, in like manner, makes contact between contacts 24 and 25, when magnet 20 is energized and breaks contact therebetween when said magnet is deënergized. The switch 18, breaks contact between the points 26 and 27, when its control magnet 21 is energized, said contacts being normally closed upon each other when said magnet 21 is deënergized.

Suppose the car is at rest at some point intermediate its upper and lower limits of travel and it is desired to cause it to descend. The "down" push button 7, at some point of control is depressed. I will now explain the circuit conditions and connections affected, it being remembered that in the case supposed the upper and lower limit switches are in position, respectively, to close circuit between contacts 9, 10, and between 13 and 14. The depression of the "down" push button 7 completes the following circuit: from one side of battery or other source of low voltage current 28, through wire 29, wire 30, lower switch 12, contacts 13, 14, wire 31, "down" push button 7, whichever one may be depressed, wire 32, coils of magnet 20, wire 33, contact 34, on the "down" solenoid switch 4, to contact 35, since, in the case supposed, the "down" solenoid 2 is deënergized and therefore points 34, 35, are in contact with each other, wire 36, contact 37, which in the supposed case is closed to contact 38 on the switch 3, and wire 39 to the other pole of the battery 28.

Similarly, in case, under like conditions, an "up" button 5 is depressed the circuit thereby completed is traced as follows: from battery 28, wire 29, wire 30, upper limit switch 8, contact 9, contact 10, wire 40, "up" push button 5, whichever one is depressed, wire 41, the coils of magnet 19, wire 33, and on to the battery 28 as above traced for the "down" button.

From the foregoing it will be seen that by depressing the "down" button the circuit of magnet 20 is closed but only when the car is not at the lower limit of its travel, and, similarly, by depressing the "up" button the circuit of magnet 19 is closed, but only when the car is not at its upper limit of travel, and providing also, in both cases, that both switches 3, 4, are open, since the closing of either switch 3 or 4 will open the circuits of the magnets 19, 20, as the case may be at either the contacts 34, 35, or the contacts 37, 38.

Now let us take the case where an "up" button 5 has been depressed and the circuit of magnet 19 has been completed from the low voltage source 28. Thereupon the switch 16 will be actuated to complete contact between 22 and 23. Thereupon the following circuit is completed: from the high voltage, main or wall switch 42, through wire 43, contact 27, contact 26 (these contacts being closed upon each other except when magnet 21 is energized), switch 18, wire 44, switch 16, contact 22 (the circuit between switch 16 and contact 22 being closed by the energization of magnet 19) wire 45, the coils of solenoid 1, and wire 46 to the return or negative side of the switch 42. The closing of this circuit last traced causes the solenoid 1 to become energized thereby operating switch lever 3 to break contact between the points 37, 38, and to complete circuit between the contacts 48, 49, and between contacts 53 and 52, 57. The breaking of the circuit between contacts 37, 38, opens the battery circuit which includes the magnet 19, and consequently the circuit, last traced, of the solenoid 1 is opened between contact 22 and switch 16. The operation of the switch 3 through the energization of solenoid 1, as above explained, completes the following auxiliary or by circuit through said solenoid 1: from the main or wall switch 42, through wire 43, contacts 27, 26, switch 18, wire 44, wire 47, contact 48, contact 49, wire 50, wire 45, the coils of solenoid 1, wires 46, to the return side of main switch 42. The closing of this auxiliary circuit through the solenoid causes the said solenoid to continue to be energized and the switch 3 to be closed notwithstanding the opening of the battery circuit through the magnet 19, and consequently the cycle of operation inaugurated by the depression of the control button continues after only a momentary closing of the battery or low voltage circuit no matter how long the depression may continue, thereby preventing a continued drain on the low voltage source of current.

Through the usual or any well known or convenient arrangement of circuit connections (not shown) to the hoisting motor, controlled by the switch 3, the closing of said switch by the operation above described, starts up the motor in a direction to cause the car to ascend and the upward travel thereof continues until a "stop" button is depressed or until the car arrives at its upper limit of travel. For the purpose of explanation let it be supposed that the car reaches the upper limit of its travel. I will now explain the operation which takes place. The switch 8 is thrown by the car to open the connection between contacts 9 and 10, and to close the connection between contacts 9 and 11. The opening of the connection between contacts 9 and 10, renders inoperative the "up" push button even though all the other portions of the circuits which they control be complete. The closing of the connection between contacts 9 and 11 completes the following circuit: from battery 28, wire 29, wire 30, switch 8, contact 9, contact 11, wire 51, contact 52, contact 53, on switch 3 (this switch having been actuated and being maintained in actuated position by the continued energization of solenoid 1), wire 54, the coils of magnet 21, and wire 55 to the other side of the battery 28. The closing of this circuit causes magnet 21 to become energized thereby actuating switch 18 and opening the connection between contacts 26, 27. The opening of this connection breaks the circuit through which the solenoid 1 is being energized, and thereupon the switch 3 is opened. The opening of this switch breaks the connection between contacts 52, 53, thereby opening the circuit of magnet 21, thereby opening the battery circuit and causing the connection to be again established between contacts 26, 27, without, however, completing any circuit.

In similar manner the arrival of the car at the limit of its downward travel will cause the switch 12, to open the connection between contacts 13, 14, and to close the connection between the contacts 13, 15, thereby completing the circuit of magnet 21 from the battery 28, through wire 29, wire 30, switch 12, contact 13, contact 15, wire 61, contact 62, contact 63 on the switch lever 63, which at this time is closed, it being supposed that the car is descending, wire 64, wire 54, magnet 21, wire 55, to battery. The closing of this circuit performs the same function as before, namely, it causes the energizing circuit of the solenoid to be opened at the contacts 27, 26, the opening of which causes the switch 4 to open thereby breaking the circuit of the battery through magnet 21 at the contacts 62, 63.

Suppose it is desired to stop the car at any intermediate floor or landing point. In that case a "stop" button 6 will be depressed. Thereupon the following circuit will be completed: from battery 28, wire 29, wire 30, "stop" 6 (whichever one is depressed), wire 56, contact 57, (assuming the car to be ascending) contact 53, wire 54, magnet 21, and return to battery through wire 55. In case the car is descending then the above circuit would be traced from wire 56 to contact 65, contact 63, wire 64, wire 54, and on to battery through magnet 31. In either case the resulting energization of magnet 21 will open the connection between contacts 26, 27, which action will open the circuit of whichever solenoid 1 or 2 may be in operation according to whether the car is moving up or down, thereby opening the corresponding switch 3 or 4, as the case may be, and breaking the hoisting motor circuit and stopping the car. The opening of the switch 3 or 4, will also open the energizing circuit of magnet 21, thereby also opening the battery circuit, and restoring the control circuit system to its normal inoperative condition ready for use, with all battery circuits open.

It is obvious that the elevator hatchway doors at the various landings may also be equipped with switches which may be included in the return battery wire or connection 39, and closed only when the hatchway doors are closed, and since the return battery connection 39 is included in the circuits controlled by the "up" as well as the "down" buttons, it will be seen that the car cannot be started from any position of rest unless all the hatchway doors are closed. I have indicated the hatchway door switches by reference numeral 60.

Having now set forth the objects and nature of my invention and a system and circuit arrangement embodying the principles thereof, what I claim as new and useful and of my own invention, and desire to secure by Letters Patent is:—

1. In a control system for electrically operated hoisting mechanism, and in combination with a high voltage current source, and operating switches for controlling the supply of working current therefrom, a low voltage current source, circuits supplied from said low voltage current source for controlling said operating switches and means to immediately open said circuits after being closed to initiate the closing movement of said switches.

2. In a control system for electrically operated hoisting mechanism, and in combination with a high voltage current source, and operating switches for controlling the supply of working current therefrom, a low voltage current source, circuits supplied from said low voltage current source for controlling said operating switches, and means controlled by the movement of said switches when actuated by the closing of said first mentioned circuits for immediately opening said first mentioned circuits.

3. In a control system for electrically operated hoisting mechanism, hoisting motor control devices, a high voltage current source, circuits therefor, means arranged in said circuits for controlling said control devices, a low voltage current source, circuits therefor, means for closing said low voltage circuits, electrical devices arranged in said low voltage circuits for closing the high voltage circuits, and means operated by the closing of the high voltage circuits for immediately opening the low voltage circuits.

4. In a control system for electrically operated hoisting mechanism, hoisting motor control devices, a high voltage current source, circuits therefor, means arranged in said circuits for controlling said control devices, a low voltage current source, circuits therefor, selective devices for closing said low voltage circuits, means operated by the closing of said low voltage circuits for closing the high voltage circuits to operate said control devices, and means actuated by the operation of said control devices for immediately opening said low voltage circuits.

5. In a control system for electrically operated hoisting mechanism, a plurality of selective control devices, circuits including the same, a switch actuated by the closing of each of said circuits, and means controlled by the actuation of each switch for immediately opening the circuit, the closing of which actuated said switch.

6. In a control system for electrically operated hoisting mechanism, selective control devices, circuits including the same with a low voltage current source, a switch actuated by the closing of each circuit, means controlled by the actuation of each switch for closing a high voltage working circuit, and means operated by the closing of said working circuit for immediately opening said low voltage current circuits.

7. In a control system for electric elevators, selective control devices located at the various hatchway landings, circuits for said devices, switches controlled by said circuits, main switches controlled by said first mentioned switches, and means actuated by the operation of said main switches for immediately opening the selective control circuit.

8. In a control system for electrically operated elevators, main switches, electrically operated devices for actuating the same, circuits for said devices, said circuits including auxiliary switches, magnets for controlling said auxiliary switches, selectively controlled circuits for said magnets, and means operated by the closing of a main switch for immediately opening the circuit of the magnet which controlled the device which operated said main switch.

9. In a control system for electrically operated elevators, main switches, electrically operated devices for actuating the same, circuits for said devices, said circuits including auxiliary switches, magnets for controlling said auxiliary switches, selectively controlled circuits for said magnets, limit stop switches and a low voltage current source including in said magnet circuits, and means operated by the closing of a main switch for opening the low voltage current circuits.

10. In a control system for elevators, direction controlling switches, an electrically operated device for actuating each of said switches, a circuit for each of said devices, normally closed contacts arranged in said circuits, a magnet operating, when energized, to open said contacts, automatic switch controlled circuits for said magnet, said direction controlling switches also operating to control the circuits of said magnet, and selectively controlled devices for also controlling the circuits of said direction controlling switch actuating devices.

11. In a control system for elevators, direction controlling switches, an electrically operated device for actuating each of said switches, a circuit for each of said devices, normally closed contacts arranged in said circuits, a magnet operating, when energized, to open said contacts, automatic switch controlled circuits for said magnet, said direction controlling switches also operating to control the circuits of said magnet, auxiliary contacts also arranged in the circuit of each switch actuating device, magnets for closing said auxiliary contacts, circuits for said last mentioned magnets, and selective devices for controlling said last mentioned circuits.

12. In a control system for elevators, direction controlling switches, an electrically operated device for actuating each of said switches, a circuit for each of said devices, normally closed contacts arranged in said circuits, a magnet operating, when energized, to open said contacts, automatic switch controlled circuits for said magnet, said direction controlling switches also operating to control the circuits of said magnet, auxiliary contacts also arranged in the circuit of each switch actuating device, magnets for closing said auxiliary contacts, circuits for said last mentioned magnets and including selective control devices, and means also controlled by said direction controlling switches for controlling said last mentioned magnet circuits.

13. In a control system for elevators, magnet circuits therefor including a low voltage source of current, selective control, limit stop and door switches also included in said circuits, power controlling switches for a source of high voltage current, means made operative by the closing of any of said magnet circuit switches for closing a power closing switch, and means actuated by the closing of the power controlling switch for opening the magnet circuits.

14. In a control system for elevators, magnet circuits therefor including a low voltage source of current, selective control, limit stop and door switches also included in said circuits, power controlling switches for a source of high voltage current, solenoids for actuating the same, main and auxiliary circuits for said solenoid, means made operative by the closing of any of said magnet circuits for closing a solenoid circuit, means controlled by the closing of a power control switch for opening the magnet circuits, and means also controlled by the closing of a power control switch for opening the main solenoid circuit and closing the auxiliary circuit.

In testimony whereof I have hereunto set my hand, in the presence of the subscribing witnesses, on this 20th day of January, A. D. 1915.

HAROLD ROWNTREE.

Witnesses:
L. FRANK JOHNSON,
CHAS. A. GERING.